(12) United States Patent
Hanai et al.

(10) Patent No.: US 11,953,425 B2
(45) Date of Patent: Apr. 9, 2024

(54) CORE INSPECTION DEVICE, CORE INSPECTION SYSTEM, AND CORE INSPECTION METHOD

(71) Applicant: SINTOKOGIO, LTD., Nagoya (JP)

(72) Inventors: Takashi Hanai, Toyokawa (JP); Hiroki Matsuoka, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 855 days.

(21) Appl. No.: 16/981,998

(22) PCT Filed: Feb. 1, 2019

(86) PCT No.: PCT/JP2019/003721
§ 371 (c)(1),
(2) Date: Sep. 17, 2020

(87) PCT Pub. No.: WO2019/207890
PCT Pub. Date: Oct. 31, 2019

(65) Prior Publication Data
US 2021/0123857 A1 Apr. 29, 2021

(30) Foreign Application Priority Data
Apr. 27, 2018 (JP) ................................ 2018-087435

(51) Int. Cl.
*G01N 21/25* (2006.01)
*G01S 17/08* (2006.01)
(52) U.S. Cl.
CPC ............ *G01N 21/251* (2013.01); *G01S 17/08* (2013.01)

(58) Field of Classification Search
None
See application file for complete search history.

(56) References Cited

U.S. PATENT DOCUMENTS 5,714,734 A * 2/1998 Peterson .............. B23K 9/0956
   219/130.21
5,924,475 A * 7/1999 Beckwith ................ B22C 9/123
   164/16
2017/0182605 A1* 6/2017 Rajagopalan ............ B23K 9/32
2018/0266961 A1* 9/2018 Narayanan ........... G01N 21/718

FOREIGN PATENT DOCUMENTS

| CN | 1128966 A | 8/1996 |
| CN | 104972079 A | 10/2015 |
| CN | 205851802 U | 1/2017 |
| JP | S60-115345 A | 6/1985 |

(Continued)

OTHER PUBLICATIONS

International Preliminary Report on Patentability dated Nov. 5, 2020 for PCT/JP2019/003721.

*Primary Examiner* — Hovhannes Baghdasaryan
(74) *Attorney, Agent, or Firm* — Faegre Drinker Biddle & Reath LLP (57) ABSTRACT

A core inspection device for inspecting a core, the device including a color sensor configured to detect a measured value of each color component of the color of the surface of the core, and a determination unit configured to compare the measured value of at least one color component detected by the color sensor with a threshold prepared corresponding to the at least one color component, thereby determine if a strength property of the core is acceptable or not.

6 Claims, 9 Drawing Sheets (56) References Cited

FOREIGN PATENT DOCUMENTS

| | | |
|---|---|---|
| JP | S62-172227 A | 7/1987 |
| JP | H06-071383 A | 3/1994 |
| JP | H8-136428 A | 5/1996 |
| JP | H8-509666 A | 10/1996 |
| JP | H10-216899 A | 8/1998 |
| JP | 2006-266959 A | 10/2006 |
| WO | WO-95/032824 A1 | 12/1995 |
| WO | WO-2017/199959 A1 | 11/2017 |

* cited by examiner

CORE INSPECTION DEVICE, CORE INSPECTION SYSTEM, AND CORE INSPECTION METHOD

TECHNICAL FIELD

The present disclosure relates to a core inspection device, a core inspection system, and a core inspection method.

BACKGROUND ART

Patent Document 1 discloses a device for determining if the strength of a core is acceptable or not. This device evaluates the strength of a test piece of a collapsible core (for example, a sand core).

Then, the measurement result of the test piece is used as a representative property of the collapsible core.

CITATION LIST

Patent Document

Patent Document 1: Japanese Unexamined Patent Publication No. H08-136428

SUMMARY OF INVENTION

Technical Problem

From the perspective of quality control, it is more desirable to conduct a substantial inspection than to conduct an inspection using test pieces. The present disclosure provides a technique capable of easily evaluating the strength properties of a core.

Solution to Problem

One aspect of the present disclosure is a core inspection device for inspecting a core, including a color sensor detecting a measured value of each color component of the color of the surface of the core; and a determination unit comparing the measured value of at least one color component detected by the color sensor with a threshold prepared corresponding to the at least one color component, thereby determining if a strength property of the core is acceptable or not.

In the core inspection device, the color sensor detects the measured value of each color component of the color of the surface of the core. Then, the detected measured value of at least one color component is compared with the threshold. It is considered that the color components of the color of the surface of the core are correlated with the strength properties of the core. For example, if a core is baked, the color of the surface of the core indicates the baked degree of the core. If the core is not baked sufficiently, the strength of the core degrades. Therefore, it is speculated that the baked degree of the core is correlated with the strength properties of the core. In the core inspection device, the determination unit compares the detected measured value of at least one color component with the threshold. Then, the determination unit determines if the strength properties of the core are acceptable or not. In this manner, the core inspection device can easily evaluate the strength properties of the core by determining the color components of the color of the surface of a core based on the threshold.

In an embodiment, the at least one color component may include a plurality of color components, the threshold may be prepared for each of the plurality of color components, and the determination unit may determine if the strength properties of the core are acceptable or not based on a combination of determination results of the plurality of color components. It is considered that a plurality of color components of the color of the surface of a core have different correlations with the strength properties of the core. Therefore, the core inspection device can evaluate the strength properties of the core more accurately by combining the results of comparison of the color components with the thresholds prepared for the respective color components.

In an embodiment, the core inspection device may include a guide member controlling the distance between the core and the color sensor so that the distance becomes less than or equal to a predetermined distance. The detection results of the color sensor vary depending on the distance between the color sensor and the core. When the color sensor is put closer to the core, the color sensor cannot be placed closer to the core than a distance determined in advance by the guide member. Therefore, since the core inspection device can maintain a constant measurement distance, it can evaluate the strength properties of the core more accurately.

In an embodiment, the core inspection device may include a distance sensor measuring the distance between the core and the color sensor; and a movement unit moving at least one of the core or the color sensor based on a measurement result of the distance sensor so that the distance between the core and the color sensor reaches a target distance. The detection results of the color sensor vary depending on the distance between the color sensor and the core. Since the core inspection device can maintain a constant measurement distance using the distance sensor and the movement unit, it can evaluate the strength properties of the core more accurately.

Another aspect of the present disclosure is a core inspection system for inspecting a core, including a color sensor detecting a measured value of each color component of the color of the surface of the core; a determination unit comparing the measured value of at least one color component detected by the color sensor with a threshold prepared corresponding to the at least one color component, thereby determining if the strength properties of the core are acceptable or not; an acquisition unit acquiring operation information of a device, the device having molded the core; a generation unit generating data by associating the operation information acquired by the acquisition unit with a determination result of the determination unit; and a storage unit storing the data generated by the generation unit into a storage medium. In such a case, information as to whether the strength properties are acceptable or not is associated with the operation information of the device that has molded the core, and is then stored into the storage medium. Therefore, the core inspection system can provide the operation information of the device that has molded the core with degraded strength properties, for example.

A still another aspect of the present disclosure is an inspection method for inspecting a core, including the steps of: detecting, with a color sensor, a measured value of each color component of the color of the surface of the core; and comparing the measured value of at least one color component detected by the color sensor with a threshold prepared corresponding to the at least one color component, thereby determining if the strength properties of the core are acceptable or not.

According to such a core inspection method, identical advantageous effects to those of the core inspection device can be achieved.

Advantageous Effects Of Invention

According to the various aspects and embodiments of the present disclosure, the strength properties of a core can be easily evaluated.

DESCRIPTION OF EMBODIMENTS

Hereinafter, embodiments will be described with reference to the accompanying drawings. In the description of the drawings, identical elements are denoted by identical reference numerals, and overlapped description will be omitted. The dimension proportions of the drawings do not necessarily correspond to those described hereinafter.

First Embodiment

Configuration of Core Inspection Device

A core inspection device according to an embodiment is a device for inspecting a core. The "core" refers to a molding element inserted into a casting mold. Examples of cores include sand cores. A core is obtained by, for example, baking core sand (for example, resin-coated sand) that has been poured to fill a mold. The core inspection device determines if a core is defective or not. For example, the core inspection device determines if the strength properties of a core are acceptable or not.

Figure 1:
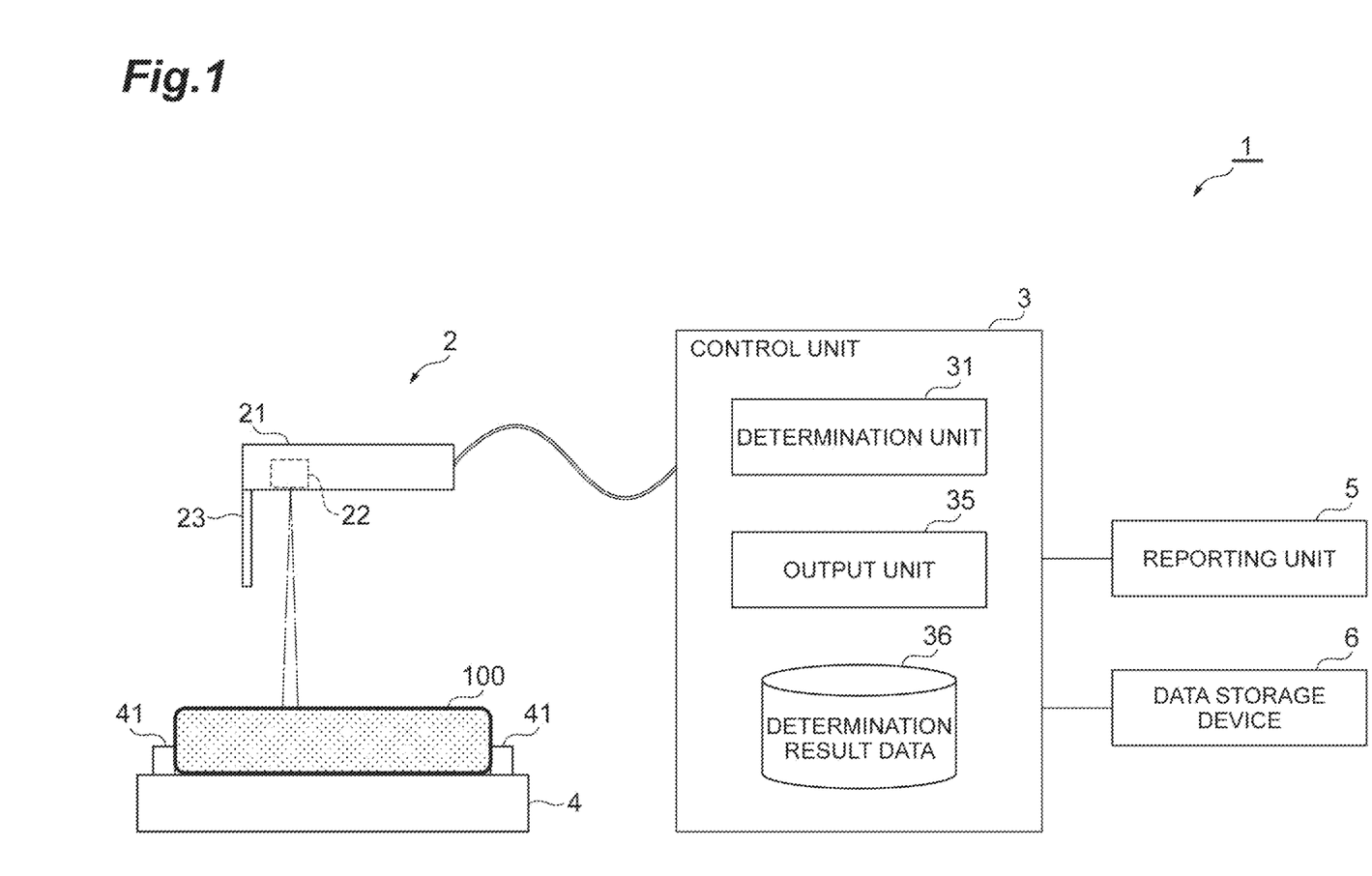
FIG. 1 is a diagram illustrating an exemplary core inspection device according to a first embodiment.

FIG. 1 is a diagram illustrating an exemplary core inspection device according to the first embodiment. As illustrated in FIG. 1, a core inspection device 1 according to the first embodiment includes a color measuring instrument 2 and a control unit 3.

The color measuring instrument 2 is an instrument for measuring the color of a core. For example, the color measuring instrument 2 is a portable instrument operated by an operator. The color measuring instrument 2 includes a body 21, a color sensor 22, and a guide member 23. The color sensor 22 is provided within the body 21.

The color sensor 22 detects a measured value of each color component of the color of the surface of the core 100. The color components include three colors of red, green, and blue. The color sensor 22 measures the surface of the core 100 without contact. For example, the color sensor 22 outputs a measurement light beam to a target, and detects a measured value of each color component based on reflected rays from the target. The measured value is output as a current value of 4 mA to 20 mA, for example. The color sensor 22 may output a spot-like measurement light beam or a linear measurement light beam. The color sensor 22 may be any sensor that can detect at least one of red, green, or blue.

The guide member 23 controls the distance between the core 100 and the color sensor 22 so that the distance becomes less than or equal to a predetermined distance. The guide member 23 is a rod-like member disposed on the body 21, for example. When an operator puts the body 21 closer to the core 100, the rod-like member bumps against the core 100. That is, the predetermined distance is the length of the guide member 23 projecting from the body 21. With the guide member 23, variation in the distance between the core 100 and the color sensor 22 during measurement can be suppressed.

The core 100 is disposed on a support base 4, and is positioned by a fixation portion 41. The core 100 may also be disposed on the support base 4 by an operator or disposed on the support base 4 by a robot. The robot operates in accordance with an operation instruction output from the control unit 3, for example.

The control unit 3 is a device that performs centralized control of the operation of the core inspection device 1. The control unit 3 is physically constructed as an ordinary computer system including a CPU (Central Processing Unit); a primary storage unit (an exemplary storage medium), such as RAM (Random Access Memory) and ROM (Read Only Memory); an input device, such as a touch panel and a keyboard; an output device, such as a display; and an auxiliary storage device (an exemplary storage medium), such as a hard disk.

The control unit 3 is communicably connected to the color measuring instrument 2. The control unit 3 receives measurement results of the color measuring instrument 2. The control unit 3 functionally includes a determination unit 31 and an output unit 35.

The determination unit 31 compares the measurement value of at least one color component detected by the color sensor 22 with a threshold prepared corresponding to the at least one color component, thereby determining if the strength properties of the core 100 are acceptable or not. The determination unit 31 may perform determination for only one of the red component, the green component, or the blue component, or for all of the red component, the green component, and the blue component. That is, at least one color component can include a plurality of color components. The threshold is prepared for each color component. That is, a threshold for the red component, a threshold for the green component, and a threshold for the blue component are provided as the thresholds. The thresholds are predetermined values. The thresholds are determined based on the results of a simulation or a test process, for example. The thresholds can be appropriately set according to the colors of reclaimed sand and new sand, the mix proportion thereof, the shape of the core 100, and the like.

The determination unit 31 may vary the magnitude relationship between the measured value and the threshold as well as the determination result for each color component. For example, the determination unit 31 determines that the strength properties of the core 100 are acceptable (i.e., the core 100 is not defective) if the value of the green component is less than or equal to the threshold for the green component. In addition, the determination unit 31 may determine that the strength properties of the core 100 are acceptable if the value of the blue component is greater than or equal to the threshold for the blue component. The magnitude relationship used for such determination is determined based on the results of a simulation or a test process, for example.

The threshold may include an upper limit threshold and a lower limit threshold. That is, the determination unit 31 may determine that the strength properties of the core 100 are acceptable if the measured value is included in the range defined by the upper limit threshold and the lower limit threshold. It is also possible to set a plurality of ranges each defined by an upper limit threshold and a lower limit threshold. That is, the determination unit 31 may perform stepwise evaluation.

If the determination unit 31 performs determination for a plurality of color components, whether the strength properties of the core 100 are acceptable or not may be determined based on a combination of the determination results of the plurality of color components. For example, the determination unit 31 may determine that the strength properties of the core 100 are acceptable if both the determination result of the green component and the determination result of the blue component are acceptable.

The output unit 35 outputs the determination result of the determination unit 31 as determination result data 36. The output destination may be the storage medium of the control unit 3 or an external device connected to the control unit 3.

The control unit 3 is connected to a reporting unit 5 and a data storage device 6 (an exemplary storage medium) as exemplary external devices. The reporting unit 5 is a device for reporting information to an operator. Examples of the reporting unit 5 include a display, a speaker, and a rotating lamp. The data storage device 6 is an external storage medium or a data server or the like connected via a network.

The output unit 35, for example, displays an image on the display based on the determination result data 36. The output unit 35, for example, causes the speaker to output sound based on the determination result data 36. The output unit 35, for example, turns on the rotating lamp based on the determination result data 36. The output unit 35, for example, causes the data storage device 6 to store the determination result data 36.

The output unit 35 may output as the determination result data 36 not only the determination result (i.e., if a product is defective or not) but also the measured value of each color component as the measurement result, the burnt color level determined according to the measured value, the measurement distance, the measurement date and time, and data associated with the name of the operator and the like.

Core Inspection Method

Figure 2:
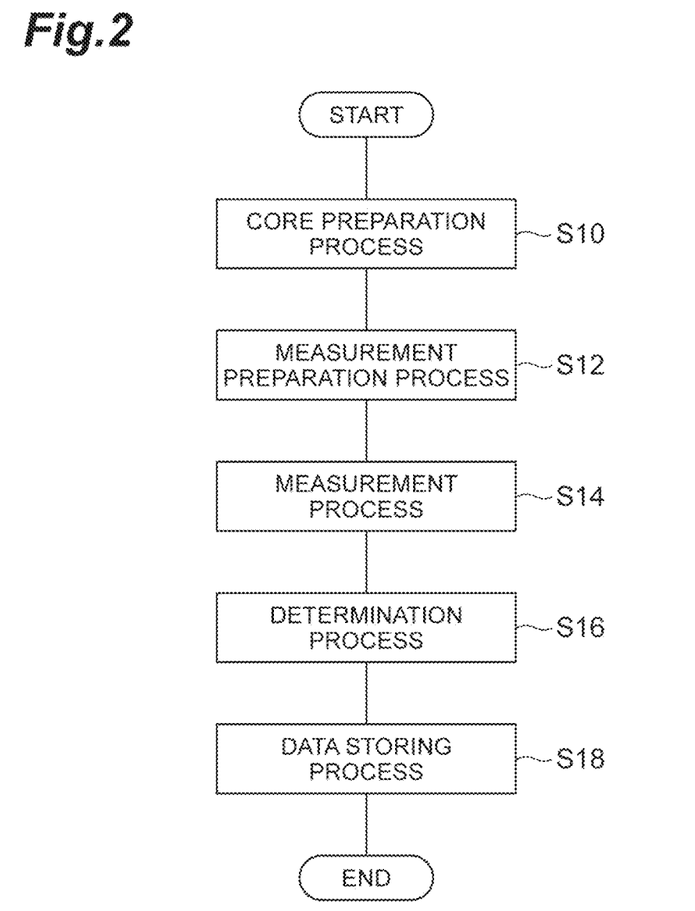
FIG. 2 is a flowchart illustrating an exemplary core inspection method.

FIG. 2 is a flowchart illustrating an exemplary core inspection process. The flowchart illustrated in FIG. 2 is executed by the control unit 3 at a timing when an operator has pressed a start button for preparation for measurement, for example.

As illustrated in FIG. 2, the control unit 3 disposes the core 100 on the support base 4 as a core preparation process (S10). For example, the control unit 3 outputs an operation instruction to a robot to dispose the core 100. The core preparation process may also be executed by the operator.

Next, the control unit 3 determines that the operator has pressed a complete button for preparation for measurement as a measurement preparation process (S12). The operator checks the light beam irradiation position of the color measuring instrument 2 (i.e., the position of the core 100 to be measured), and presses the guide member 23 of the color measuring instrument 2 against the core 100. Upon completing the preparation, the operator presses the complete button for preparation for measurement.

Next, the control unit 3 acquires a measured value of each color component from the color measuring instrument 2 as a measurement process (S14: a step of detecting a measured value). The operator presses a measurement start button of the color measuring instrument 2, for example, to start measurement. When the measurement start button is pressed, the color measuring instrument 2 detects a measured value of each color component of the color of the surface of the core 100. The control unit 3 obtains the measured value of each color component from the color measuring instrument 2.

Next, the control unit 3, as a determination process (S16: a step of determining if the measurement result is acceptable or not), compares the measured value of the color component obtained in the measurement process (S14) with the threshold prepared corresponding to the color component, thereby determining if the strength properties of the core 100 are acceptable or not.

Next, the control unit 3, as a data storing process (S18), stores the determination result obtained in the determination process (S16) into the storage medium in the control unit 3 or into an external storage medium, as the determination result data 36.

Upon termination of the data storing process (S18), the flowchart illustrated in FIG. 2 ends. Through the execution of the flowchart illustrated in FIG. 2, quality inspection that uses the color of the surface of the core 100 ends.

Conclusion of First Embodiment

In the core inspection device 1 and the core inspection method, the color sensor 22 detects a measured value of each color component of the color of the surface of the core 100. Then, the detected measured value of at least one color component is compared with a threshold. It is considered that the color components of the color of the surface of the core 100 are correlated with the strength properties of the core 100. For example, when the core 100 is baked, the color of the surface of the core 100 indicates the baked degree of the core 100. If the core 100 is not baked sufficiently, the strength of the core 100 degrades. For this reason, it is speculated that the baked degree of the core 100 is correlated with the strength properties of the core 100. In the core inspection device 1 and the core inspection method, the determination unit 31 compares the detected measured value of at least one color component with a threshold. Then, the determination unit 31 determines if the strength properties of the core 100 are acceptable or not. In this manner, according to the core inspection device 1 and the core inspection method, the strength properties of the core 100 can be easily evaluated by determining the color components of the color of the surface of the core 100 based on the threshold. Therefore, the core inspection device 1 and the core inspection method can execute total inspection. Further, since the core inspection device 1 and the core inspection method perform determination by converting colors into numerical values, it is possible to reduce variation in determination as compared to when determination is performed by an operator through visual observation.

It is considered that the plurality of respective color components of the color of the surface of the core 100 have different correlations with the strength properties of the core 100. Therefore, the core inspection device 1 and the core inspection method can evaluate the strength properties of the core 100 more accurately by combining the results of comparison of the color components with the thresholds prepared for the respective color components.

The detection results of the color sensor 22 vary depending on the distance between the color sensor 22 and the core 100. When the color sensor 22 is put closer to the core 100, the color sensor 22 cannot be placed closer to the core 100 than a distance determined in advance by the guide member 23. Therefore, since the core inspection device 1 and the core inspection method can maintain a constant measurement distance, the strength properties of the core 100 can be evaluated more accurately.

Second Embodiment

Figure 3:
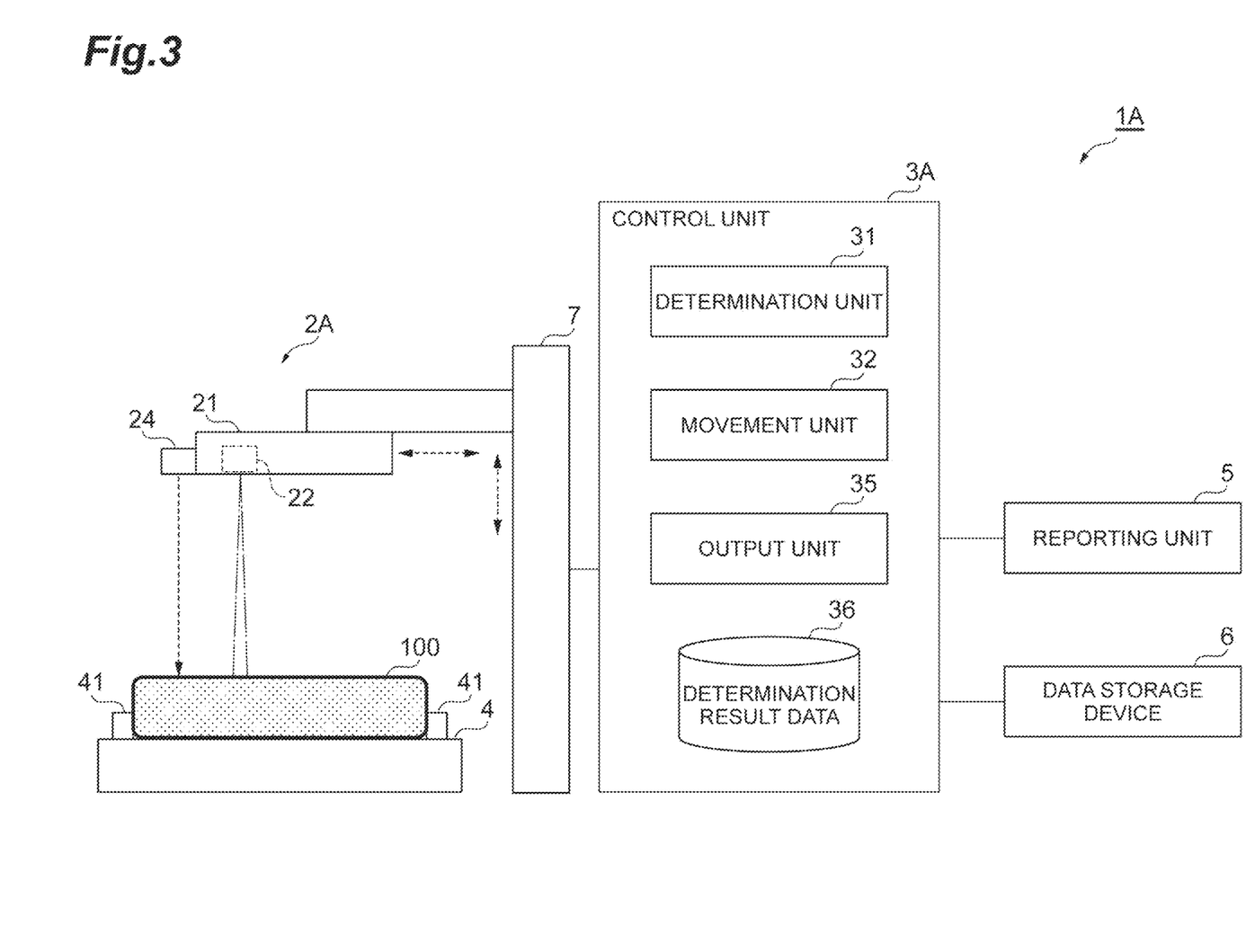
FIG. 3 is a diagram illustrating an exemplary core inspection device according to a second embodiment.

A core inspection device 1A of the second embodiment differs from the core inspection device 1 according to the first embodiment in that the color measuring instrument is positioned automatically, and is identical to the core inspection device 1 in the other points. The following will mainly describe the difference from the first embodiment, and descriptions of overlapped portions will be omitted.

FIG. 3 is a diagram illustrating an exemplary core inspection device according to the second embodiment. As illustrated in FIG. 3, the core inspection device 1A includes a color measuring instrument 2A and a control unit 3A.

The color measuring instrument 2A is an instrument provided in a facility, for example. The color measuring instrument 2A differs from the color measuring instrument 2 in having a distance sensor 24 and a movement mechanism 7 instead of the guide member 23, and is identical to the color measuring instrument 2 in the other points.

The distance sensor 24 is a detector for measuring the distance to a target. The distance sensor 24 is disposed on the body 21. The distance sensor 24 measures the distance between the core 100 and the color sensor 22. The distance sensor 24, for example, irradiates the core 100 with a laser beam and acquires reflected rays, thereby measuring the distance between the core 100 and the color sensor 22.

The movement mechanism 7 movably supports the body 21. For example, the movement mechanism 7 includes an electric motor that moves up or down the body 21 and also moves the body 21 in the horizontal direction. The movement mechanism 7 operates in accordance with an operation instruction output from the control unit 3A, for example.

The control unit 3A differs from the control unit 3 in having a movement unit 32 and is identical to the control unit 3 in the other points. The movement unit 32 moves the color sensor 22 on the basis of the measurement result of the distance sensor 24 so that the distance between the core 100 and the color sensor 22 reaches a target distance. The movement unit 32 outputs an operation instruction to the movement mechanism 7.

The other configurations of the core inspection device 1A are identical to those of the core inspection device 1. Regarding the core inspection method, processes performed by an operator in the measurement preparation process (S12) and the measurement process (S14) can be automated.

Conclusion of Second Embodiment

The detection results of the color sensor 22 vary depending on the distance between the color sensor 22 and the core 100. Since the core inspection device 1A can maintain a constant measurement distance using the distance sensor 24 and the movement unit 32, the strength properties of the core 100 can be evaluated more accurately.

Third Embodiment

Figure 4:
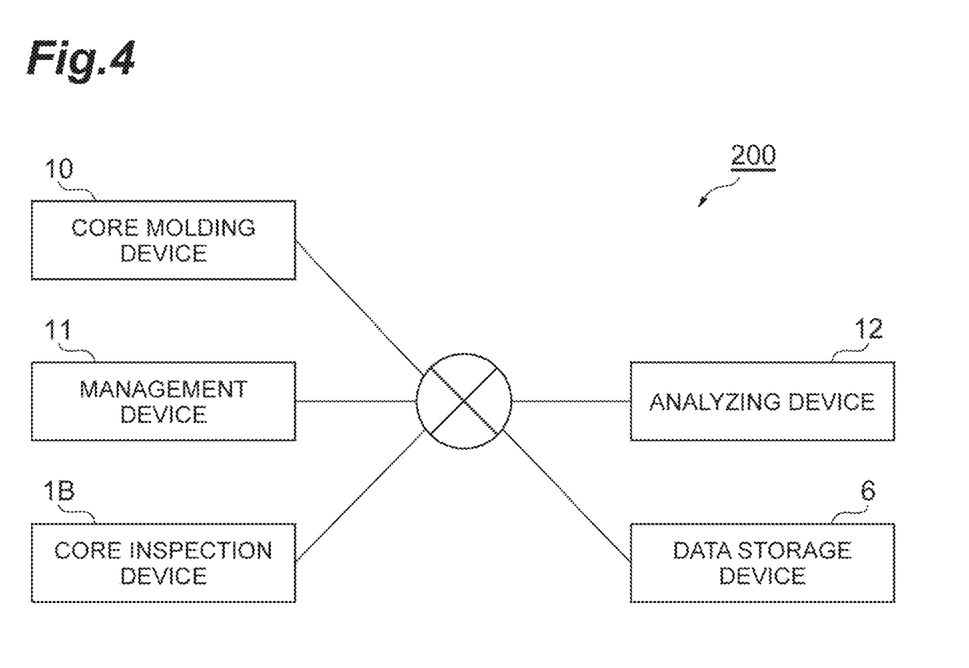
FIG. 4 is a diagram illustrating an exemplary molding system including a core inspection system according to a third embodiment.

A core inspection system according to a third embodiment is a system including a core inspection device. FIG. 4 is a diagram illustrating an exemplary molding system including the core inspection system according to the third embodiment. As illustrated in FIG. 4, a core inspection system 200 includes a core molding device 10 (an exemplary device that has molded a core), a management device 11, a core inspection device 1B, an analyzing device 12, and a data storage device 6. The core molding device 10, the management device 11, the core inspection device 1B, the analyzing device 12, and the data storage device 6 are connected to a network, and thus can mutually communicate with each other.

The core molding device 10 is a device for molding the core 100. The core molding device 10 includes a mold, for example, and molds the core 100 using a shell mold process. The core molding device 10 molds the core 100 in accordance with manufacturing conditions input to the management device 11. The manufacturing conditions are preset information serving as an operation target for the core molding device 10. The manufacturing conditions include preset values, such as the temperature of the mold, baking time, blowing pressure, and blowing time, and further include the mix proportion of sand and the types of sand, for example. The core molding device 10 is configured to be capable of obtaining operation information. The operation information is the track record data obtained from the core molding device 10 including the mold, and is information obtained as a result of molding a core based on the manufacturing conditions.

Examples of the operation information include the temperature of the mold, baking time, blowing pressure, and blowing time. The core molding device 10 outputs the operation information to the data storage device 6.

The management device 11 is a device that performs centralized control for molding the core 100. The management device 11 is configured as an ordinary computer system including a CPU, a storage device, an input device, an output device, and the like. The management device 11 is configured to be capable of receiving, as an input, the production conditions for the core molding device 10. The production conditions are known conditions related to the molding of a core (i.e., preset values set in advance before molding is performed or known matters). Examples of the production conditions include the molding machine number of the involved core molding device 10 in the case where there are a plurality of core molding devices 10, the model number assigned to each type of a product, the lot number, a core sample photograph, a threshold for determining color, manufacturing conditions, and the number of cores to be produced. The management device 11 manages the molding of the core molding device 10 based on the production conditions. For example, the management device 11 transmits the production conditions to the core molding device 10, and causes the core molding device 10 to operate in accordance with the production conditions. In addition, the management device 11 may output information related to the production conditions to the core inspection device 1B or the data storage device 6.

The core inspection device 1B differs from the core inspection device 1 according to the first embodiment in that it outputs a determination result and operation information in association with each other, and is identical to the core inspection device 1 in the other points. The following will mainly describe the difference from the first embodiment, and descriptions of overlapped portions will be omitted.

Figure 5:
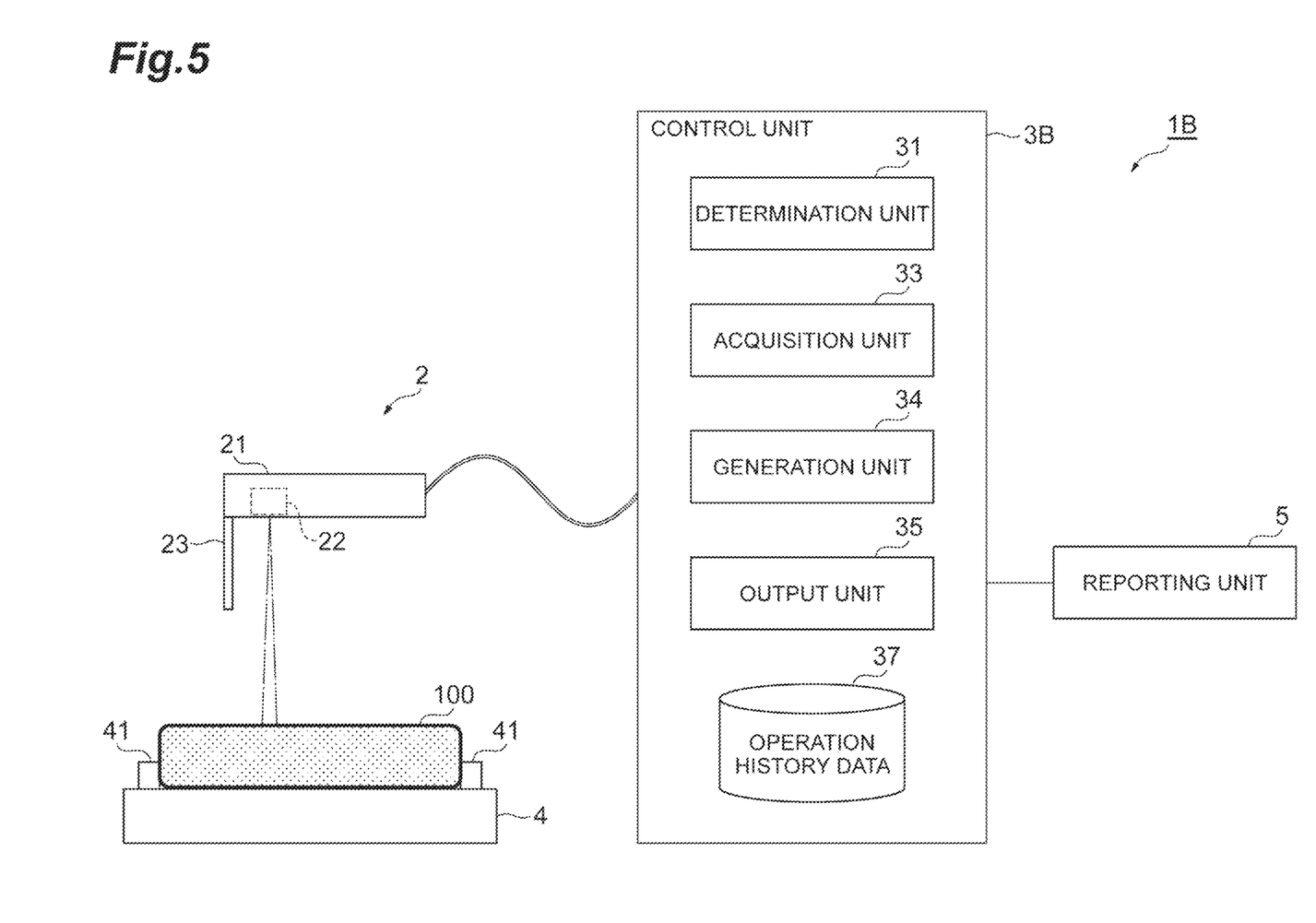
FIG. 5 is a diagram illustrating an exemplary core inspection device according to a third embodiment.

FIG. 5 is a diagram illustrating an exemplary core inspection device according to the third embodiment. As illustrated in FIG. 5, the core inspection device 1B includes a color measuring instrument 2 and a control unit 3B.

The control unit 3B differs from the control unit 3 in having an acquisition unit 33 and a generation unit 34 and having operation history data 37 instead of the determination result data 36, and is identical to the control unit 3 in the other points. In FIG. 5, a connection between the control unit 3B and the data storage device 6 is omitted (see FIG. 4).

The acquisition unit 33 acquires operation information. The acquisition unit 33 acquires the operation information of the core molding device 10, which has molded the core 100 as a target to be measured, from the data storage device 6 via the network. The acquisition unit 33 may also directly acquire the operation information from the core molding device 10 without via the data storage device 6.

The generation unit 34 generates the operation history data 37 by associating the operation information acquired by the acquisition unit 33 with the determination result of the determination unit 31. The operation history data 37 is data obtained by associating the determination result (i.e., if a product is defective or not) of the determination unit with the operation information (e.g., the temperature of the mold, baking time, blowing pressure, blowing time, the mix proportion of sand, and the types of sand). The generation unit 34 may also associate the production conditions (including the manufacturing conditions) with the determination result of the determination unit 31. For example, the acquisition unit 33 acquires the production conditions for the core 100 from the management device 11 via the network. The generation unit 34 may also associate the determination result of the determination unit 31 with the model number, the lot number, the molding machine number, or the like based on the production conditions acquired by the acquisition unit 33. The output unit 35 (an exemplary storage unit) outputs the operation history data 37 to the reporting unit 5 or the data storage device 6.

Referring back to FIG. 4, the data storage device 6 stores the operation history data 37. The data storage device 6 may also store external data other than the operation history data 37. Examples of data other than the operation history data 37 include data that is not owned by the management device 11, such as the strength of a test piece, the presence or absence of cracks measured later based on a photograph of the core, the dimensions of the cracks, and the thickness of the core.

The analyzing device 12 is a device for analyzing the status of production. The analyzing device 12 is configured as an ordinary computer system including a CPU, a storage device, an input device, an output device, and the like. The analyzing device 12 analyzes the status of production based on the information stored in the data storage device 6. For example, if the core 100 is defective, the analyzing device 12 analyzes the production conditions and the operation information for the core 100. The analyzing device 12 analyzes the tendency of the relationship among the quality (i.e., defective or non-defective) of the core, the production conditions, and the operation information. Based on the analyzed tendency, the analyzing device 12 derives optimum conditions or outputs data as a measure for preventing defective products. The analyzing device 12 may output the analysis results to the management device 11 (i.e., a feedback process). Accordingly, the core molding device 10 can mold the core 100 under the production conditions determined to be the conditions under which non-defective products can be produced.

Modified Example of Generation Unit 34

The generation unit 34 is not limited to the exemplary generation unit 34 included in the control unit 3B. For example, the generation unit 34 may be included in the management device 11. In such a case, the control unit 3B need not include the generation unit 34, and thus, the output unit 35 may output the determination result of the determination unit 31 to the management device 11. Then, the management device 11 may acquire the operation information from the data storage device 6. Alternatively, the output unit 35 may output the determination result of the determination unit 31 to the data storage device 6, and the management device 11 may acquire the determination result of the determination unit 31 via the data storage device 6.

Alternatively, the generation unit 34 may be included in the data storage device 6. In such a case, the data storage device 6 may associate pieces of aggregated data with one another.

Molding Process

Figure 6:
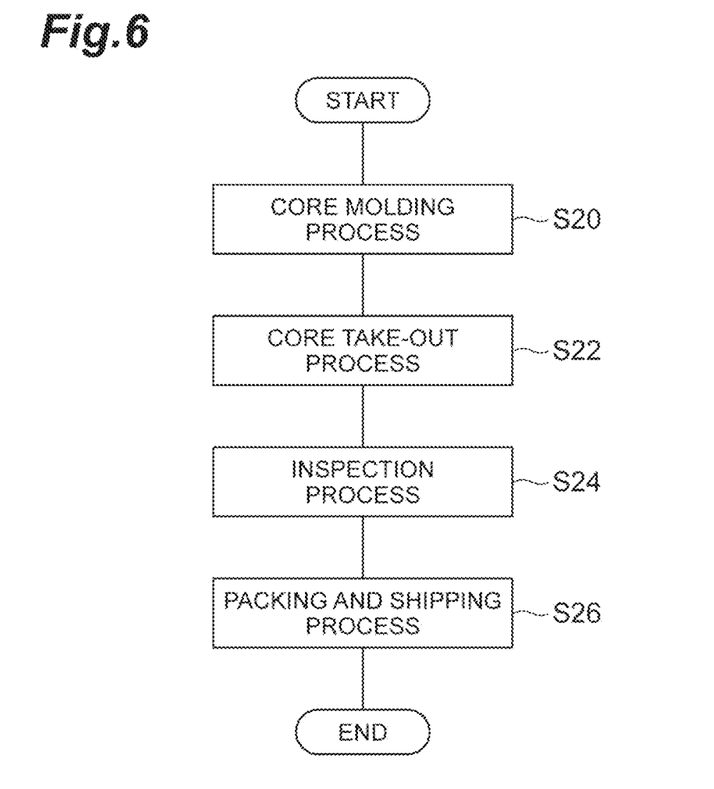
FIG. 6 is a flowchart illustrating an exemplary molding process.

Hereinafter, a series of processes from the molding of the core 100 to the shipment thereof will be described to exemplarily illustrate the timing of inspection of the core 100. FIG. 6 is a flowchart illustrating an exemplary molding process. As illustrated in FIG. 6, first, as a core molding process (S20), the core molding device 10 molds the core 100. At this time, the operation information is acquired.

Next, as a core take-out process (S22), the core molding device 10 takes the core 100 out of the device. At this time, the core molding device 10 may drop the core 100 onto a conveyor belt. The core 100 that has dropped onto the conveyor belt is transported as is to a predetermined place. The core 100 taken out is cooled.

Next, as an inspection process (S24), a robot or an operator disposes the core 100, which has been cooled, on the support base 4. Then, the core inspection device 1 performs a product quality determination process using color. Alternatively, the core inspection device 1 may directly inspect the core 100 disposed on the conveyor belt. In the inspection process (S24), inspection is performed through the same flow as that of the flowchart illustrated in FIG. 2. As the inspection process (S24), the thickness and dimensions of the core 100 may be additionally checked as a sampling inspection, or deburring or mold coating may be performed, for example. The core 100 determined to be defective in the inspection process (S24) is excluded so that the cores cannot be shipped.

Next, as a packing and shipping process (S26), a robot or an operator packs the cores 100, which have passed the inspection, and ships them. Upon termination of the packing and shipping process (S26), the flowchart illustrated in FIG. 6 ends.

Conclusion of Third Embodiment

According to the core inspection system 200, information as to whether the strength properties of the core 100 are acceptable or not is associated with the operation information of the core molding device 10 that has molded the core 100, and is then stored into the data storage device 6. Therefore, the core inspection system 200 can provide the operation information of the core molding device 10 that has molded the core 100 with degraded strength properties, for example.

Although the embodiments have been described above, the present disclosure is not limited thereto. For example, the present disclosure can be applied not only to the manufacture of cores through a shell mold process but also to any core molding process in which the color of a core to be molded changes. The color sensor 22 is not limited to a sensor that outputs a light beam. For example, the color sensor 22 may be a camera. The color measuring instrument 2 need not use the support base 4. For example, the color measuring instrument 2 may directly measure the core 100 conveyed on a conveyor belt. In such a case, the color sensor 22 may be fixed to a portion above the conveyor belt. The core inspection system 200 need not necessarily include the core molding device 10, the management device 11, and the analyzing device 12 as long as the generation unit 34 can acquire the operation information. In the core inspection device 1A, the measurement distance may be adjusted by moving the core 100 with the movement unit 32. That is, the movement unit 32 has only to move any one of the color sensor 22 or the core 100. The core inspection device 1B may adopt not the color measuring instrument 2 but the color measuring instrument 2A.

Examples

Hereinafter, various experiments conducted for purposes of evaluation of the present disclosure will be described. The present disclosure is not limited to the following experiments.

Relationship Between Baked Degree and Color Components

Figure 7:
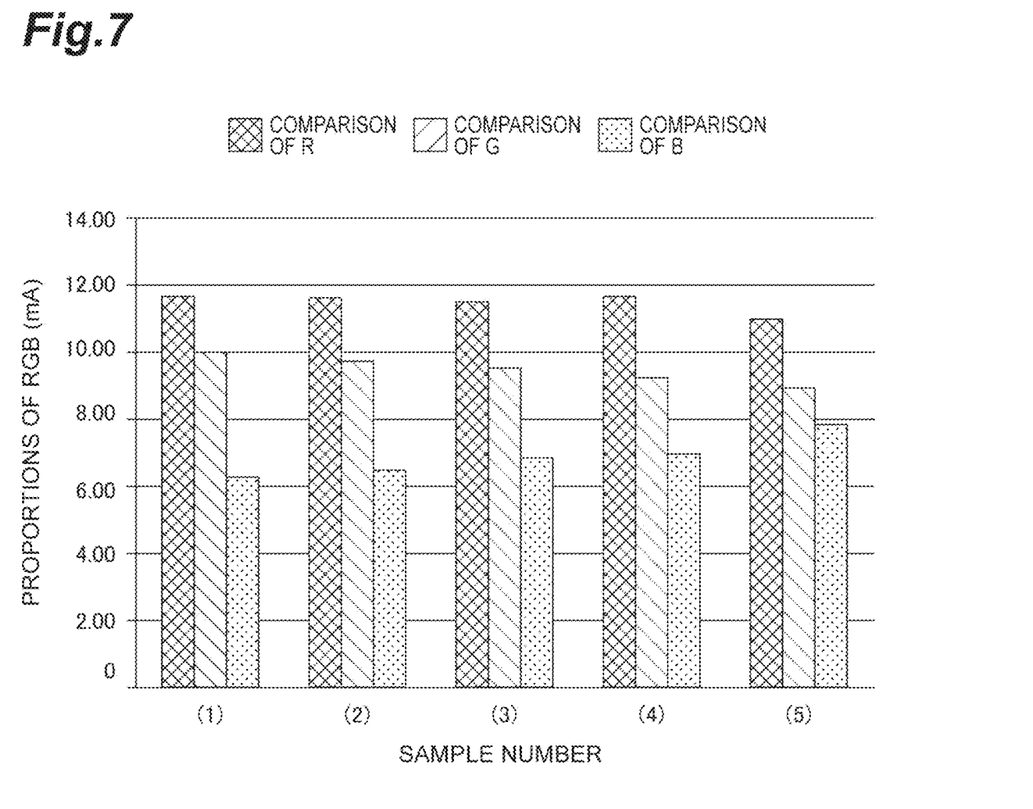
FIG. 7 illustrates the measurement results of the color components of samples with different baked degrees.

Five cores with different baked degrees were prepared. Samples numbers 1 to 5 were assigned to the thus prepared five respective cores. A greater sample number was assigned to a core with a higher baked degree. Then, the color components of the five samples were measured. FIG. 7 illustrate the results.

FIG. 7 illustrates the measurement results of the color components of samples with different baked degrees. The abscissa indicates the sample number. The ordinate indicates the proportions of RGB (i.e., measured values). As illustrated in FIG. 7, it was confirmed that the proportion of the green component is lower as the baked degree is higher. It was also confirmed that the proportion of the blue component is higher as the baked degree is higher. In this manner, it was confirmed that the color components are correlated with the baked degree. It was also confirmed that the correlation between each color component and the baked degree differs from one another. That is, it was confirmed that a plurality of color components have different correlations. Therefore, it was confirmed that combining the determination results of the plurality of color components can improve the accuracy of the inspection results.

Figure 8:
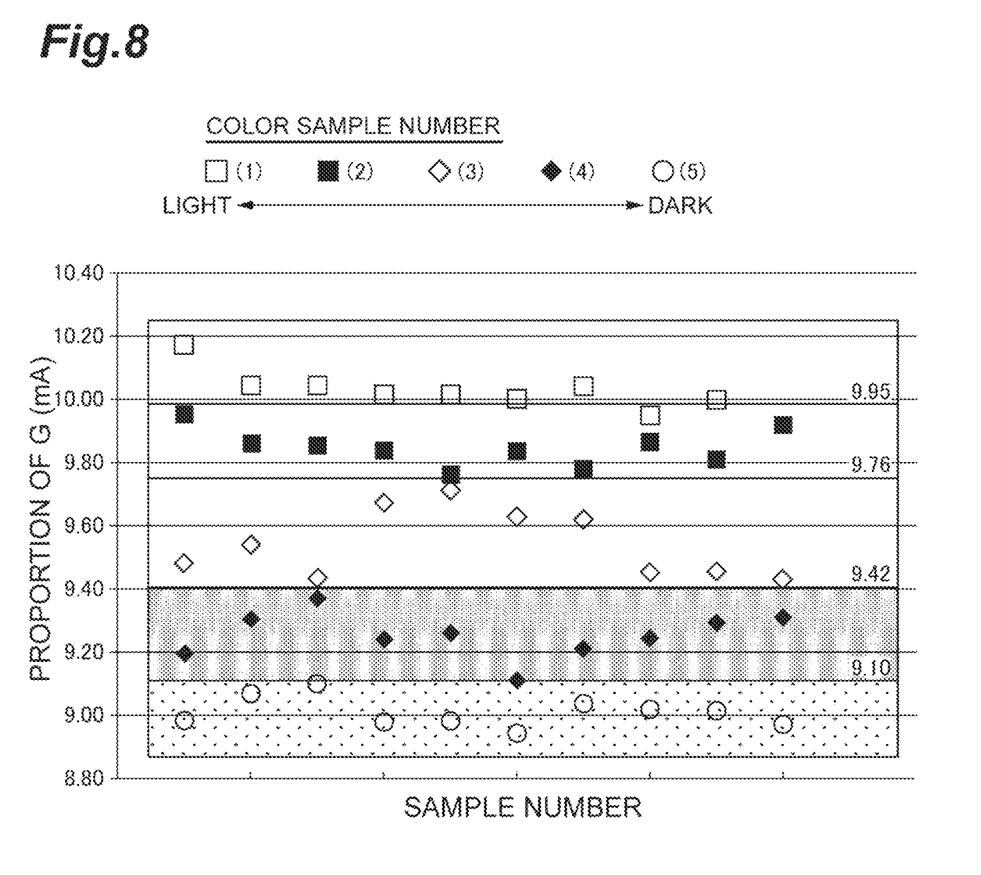
FIG. 8 illustrates the measurement results of the green component of samples with different baked degrees.

Next, with reference to the aforementioned five cores as color samples, cores, which had been separately prepared, were classified into five levels through visual observation. The classified cores were measured with the core inspection device 1. FIG. 8 illustrates the results.

FIG. 8 illustrates the measurement results of the green component of samples with different baked degrees. The abscissa indicates the sample number. The ordinate indicates the proportion of G (i.e., measured values). FIG. 8 illustrates 10 pieces of data, which have been found to match the color samples through visual observation, as data of each level. As illustrated in FIG. 8, it was confirmed that setting four thresholds, which include "9.10," "9.42," "9.76," and "9.95," as the thresholds for the green component can allow determination about which level a target core to be measured belongs.

Figure 9:
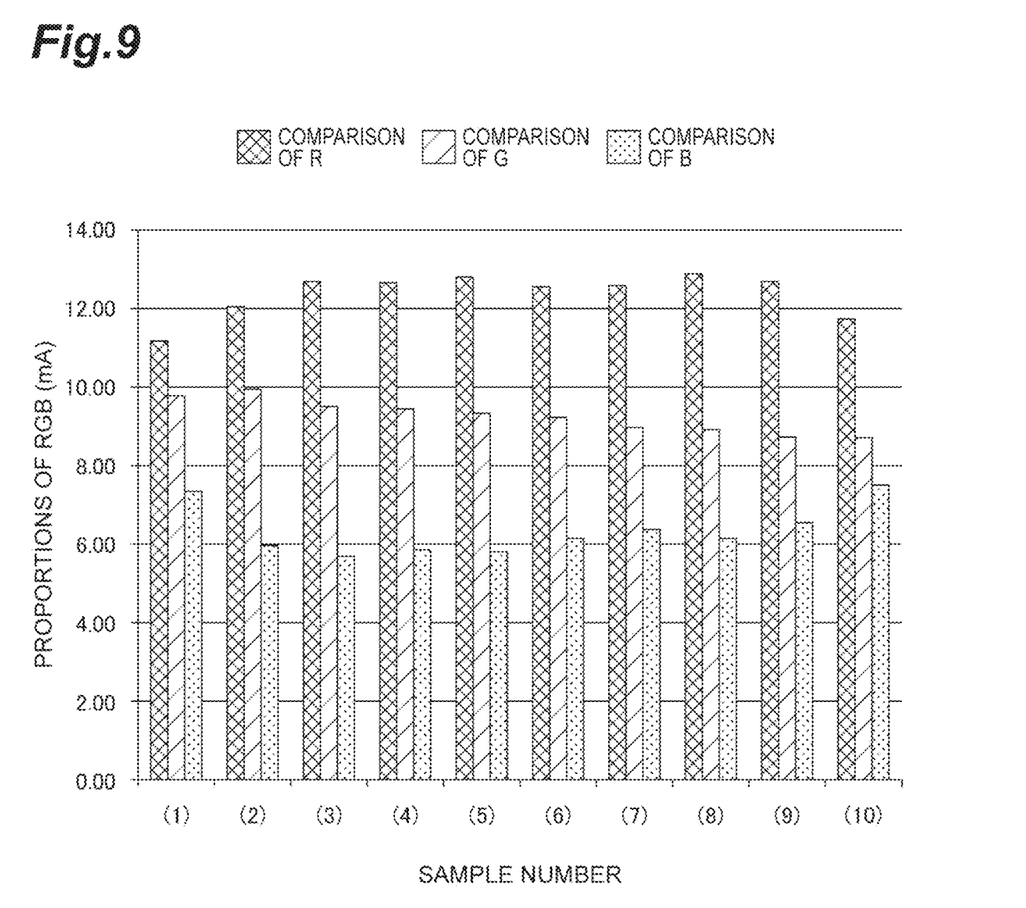
FIG. 9 illustrates the measurement results of the color components of samples with different baked degrees.

FIG. 9 illustrates the measurement results of the color components of samples with different baked degrees. The abscissa indicates the sample number. The ordinate indicates the proportions of RGB (i.e., measured values). A greater sample number was assigned to a core with a higher baked degree. In the experiments illustrated in FIG. 9, it was confirmed that each color component and the baked degree have a correlation other than the linear function. In this manner, it is not necessarily the case that the correlation becomes the linear function as illustrated in FIG. 7 depending on conditions. Therefore, it was confirmed that combining the determination results of a plurality of color components is more important.

REFERENCE SIGNS LIST 1, 1A, 1B . . . Core inspection device
2, 2A . . . Color measuring instrument
3, 3A, 3B . . . Control unit
6 . . . Data storage device (exemplary storage medium)
22 . . . Color sensor
23 . . . Guide member
24 . . . Distance sensor
31 . . . Determination unit
32 . . . Movement unit
33 . . . Acquisition unit
34 . . . Generation unit
35 . . . Output unit (exemplary storage unit)
100 . . . Core

The invention claimed is:

1. A core inspection device for inspecting a core obtained by baking, comprising:
   a color sensor configured to detect a measured value of each color component of a color of a surface of the obtained baked core;
   a determination unit configured to compare the measured value of at least one color component detected by the color sensor with a threshold prepared corresponding to the at least one color component, thereby determine if a strength property of the obtained baked core is acceptable or not;
   a distance sensor configured to measure a distance between the obtained baked core and the color sensor; and
   a movement unit configured to move at least one of the obtained baked core or the color sensor based on a measurement result of the distance sensor so that the distance between the obtained baked core and the color sensor reaches a target distance.

2. The core inspection device according to claim 1, wherein:
   the at least one color component includes a plurality of color components,
   the threshold is prepared for each of the plurality of color components, and
   the determination unit determines if the strength property of the obtained baked core is acceptable or not based on a combination of determination results of the plurality of color components.

3. The core inspection device according to claim 1, comprising a guide member controlling a distance between the obtained baked core and the color sensor so that the distance becomes less than or equal to a predetermined distance.

4. A core inspection system for inspecting a core obtained by baking, comprising:
   a color sensor configured to detect a measured value of each color component of a color of a surface of the obtained baked core;
   a determination unit configured to compare the measured value of at least one color component detected by the color sensor with a threshold prepared corresponding to the at least one color component, thereby determine if a strength property of the obtained baked core is acceptable or not;
   a distance sensor configured to measure a distance between the obtained baked core and the color sensor;
   a movement unit configured to move at least one of the obtained baked core or the color sensor based on a measurement result of the distance sensor so that the distance between the obtained baked core and the color sensor reaches a target distance;
   an acquisition unit acquiring operation information of a device, the device having molded the obtained baked core;
   a generation unit generating data by associating the operation information acquired by the acquisition unit with a determination result of the determination unit; and
   a storage unit storing the data generated by the generation unit into a storage medium.

5. An inspection method for inspecting a core obtained by baking, comprising:
   detecting, with a color sensor, a measured value of each color component of a color of a surface of the obtained baked core;
   comparing the measured value of at least one color component detected by the color sensor with a threshold prepared corresponding to the at least one color component, thereby determining if a strength property of the obtained baked core is acceptable or not;
   measuring, with a distance sensor, a distance between the obtained baked core and the color sensor; and
   moving at least one of the obtained baked core or the color sensor based on a measurement result of the distance sensor so that the distance between the obtained baked core and the color sensor reaches a target distance.

6. The core inspection device according to claim 2, comprising a guide member controlling a distance between the obtained baked core and the color sensor so that the distance becomes less than or equal to a predetermined distance.

* * * * *